March 24, 1970  HIROSHI IWASKI  3,503,024
CHUCK OF PERMANENT MAGNETS
Filed July 11, 1967  2 Sheets-Sheet 1
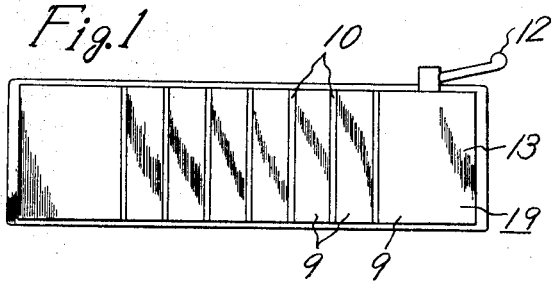
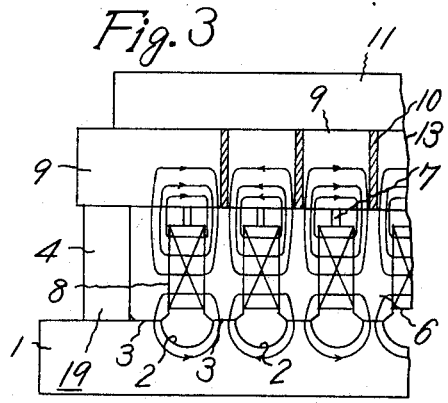
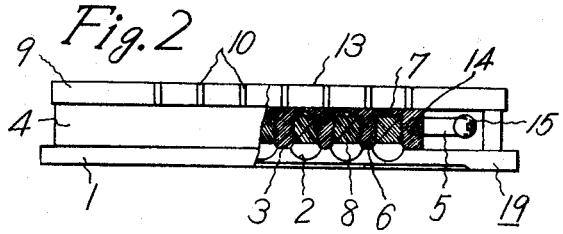
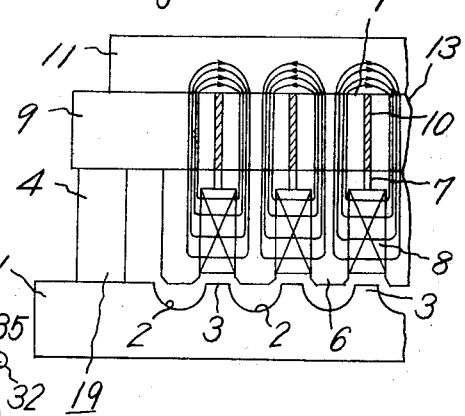
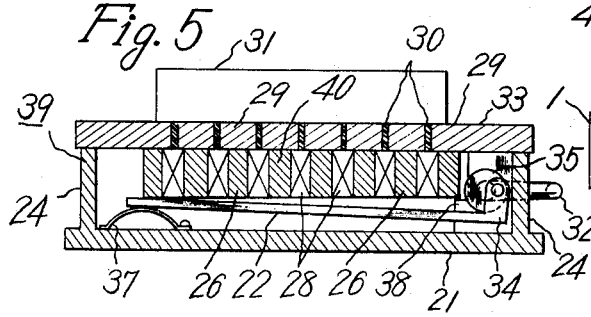
INVENTOR.
HIROSHI IWASAKI
BY

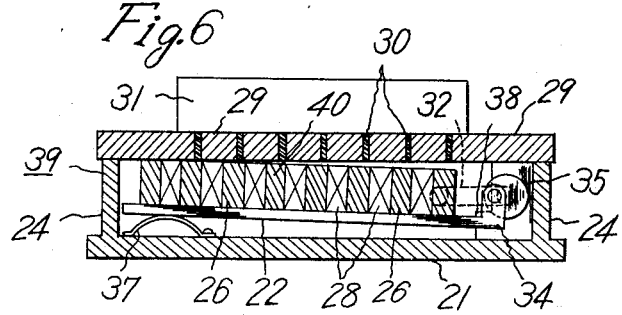
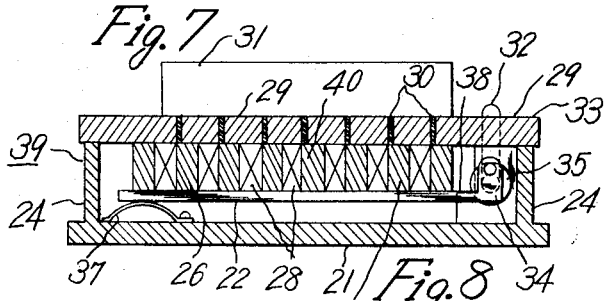
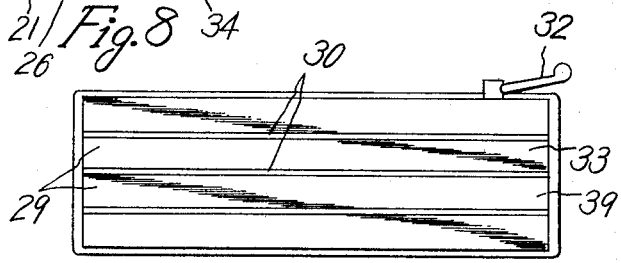
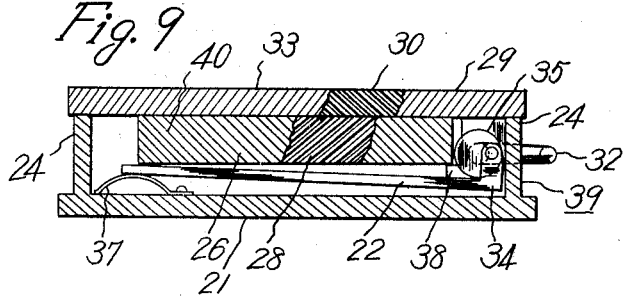

United States Patent Office 3,503,024
Patented Mar. 24, 1970

3,503,024
CHUCK OF PERMANENT MAGNETS
Hiroshi Iwasaki, Tokyo, Japan, assignor to Kabushiki Kaisha Yamato Dengyo Sha, Tokyo, Japan
Filed July 11, 1967, Ser. No. 652,536
Claims priority, application Japan, Aug. 27, 1966, 41/80,875
Int. Cl. H01f 7/20
U.S. Cl. 335—285                                    4 Claims

ABSTRACT OF THE DISCLOSURE

Improvements in a chuck of permanent magnets for use mainly in machining. The chuck is provided with a series of permanent magnets, of which the magnetic force is very easily and simply controlled for putting, displacing and removing a work on and from a table of the chuck. The chuck is characterized by such a construction that the permanent magnets are displaced into and out of a position as a whole where they are in contact with a shorting member so that the magnetic flux is confined inside the table.

BACKGROUND OF THE INVENTION

Field of the invention

The field of art to which this invention belongs is the machine tool, but it is also deemed that the chuck in accordance with this invention may be used for fixing any article of a ferromagnetic substance to the table of this chuck which is fixed to any other surface by any other means.

Description of the prior art

Such a chuck, which attracts a work onto a table thereof and fixes the same thereon by the action of permanent magnets provided therein, has been well known. However, when the work is to be detached from the table or displaced thereon, it is substantially difficult to do so by virtue of the remanence, in general, it is required to provide a demagnetizing means.

SUMMARY OF THE INVENTION

Briefly stated in accordance with one aspect of this invention, there is provided a chuck of permanent magnets, comprising a table, a plurality of permanent magnets, and a shorting member. The table comprises a plurality of ferromagnetic pieces, each of which is sandwiched between any two adjoining pieces of non-magnetic plates and extended from the top to the bottom and from a side to the opposite side of the table. The permanent magnets are horizontally alternately arranged with blocks of a ferromagnetic substance in such a manner that the permanent magnets are positioned under the non-magnetic plates concurrently and respectively, and integrated with the blocks, the polarity of the permanent magnets being arranged alternately reversely. The integrated permanent magnets and the blocks are adapted to be moved as a whole to another position where the blocks are brought into contact with the shorting member concurrently and respectively.

By virtue of the above construction, it is possible to magnetize and demagnetize the table very easily and promptly. There is no need of the provision of a demagnetizing means for operating the chuck.

BRIEF DESCRIPTION OF THE DRAWING

The invention will be better understood and other objects and additional advantages of the invention will become apparent upon perusal of the following description taken in connection with the drawings, in which:

FIG. 1 is a plan view of a chuck embodying this invention;

FIG. 2 is a partly sectional front view thereof;

FIG. 3 is an enlarged sectional front view thereof with parts removed in the inactive position;

FIG. 4 is an enlarged sectional front view thereof with parts removed similarly to FIG. 3 but in the active position;

FIG. 5 is a vertically sectional front view of another embodiment of a chuck in accordance with this invention in the active position;

FIG. 6 is a similar view to FIG. 5 but in the inactive position;

FIG. 7 is also a similar view to FIGS. 5 and 6 but showing a position intermediate from the inactive position to the active position;

FIG. 8 is a plan view of a modification; and

FIG. 9 is a vertically sectional front view thereof.

DESCRIPTION OF THE PREFERRED EMBODIMENTS

Referring more particularly to the drawings, the preferred embodiments of this invention will now be described; however, this description will be understood to be illustrative of the invention and not as limiting it to the particular constructions shown and described. A rectangular base plate 1 of a ferromagnetic substance such as soft steel is to be considered a shorting member and provided with a plurality of grooves 2 in the upper surface thereof. Each of these grooves 2 is extended from the front end to the rear end of the base plate 1 and has a semi-circular, laterally sectional cross-section, but the cross-section is not necessarily limited to the shape as illustrated. Any interval 3 between two adjoining grooves 2 is left as the smooth upper surface of the base plate 1 is. On the margin of the upper surface of the base plate 1 is fixed thereto an upright side wall 4 of a non-magnetic material having a rectangular, horizontal cross-section. An inner frame 5 of non-magnetic material is adapted to be laterally slidable inside the side wall 4. A lateral end 14 of the inner frame 5 is connected with an eccentric means 15 having handle 12 extended out of the side wall 4 so that it is possible to slide the inner frame 5 laterally by the handle 12.

There are provided inside the inner frame 5 a plurality of blocks 6 of a ferromagnetic substance. Two of them positioned at both lateral ends have bisected T-shaped or rectangular laterally vertical cross-sections and others have T-shaped or rectangular laterally vertical cross-sections, respectively. Any interval between the top flanges of these blocks 6 is filled with a non-magnetic plate 7. In the intervals between the stems of these blocks 6 are inserted permanent magnets 8, respectively. These permanent magnets 8 are positioned just under the bottom ends of the non-magnetic plates 7. The polarity of these permanent magnets 8 is alternate. The distance between any two adjoining permanent magnets 8 corresponds to the eccentricity of the eccentric means 15. These permanent magnets 8 have bottom surfaces positioned somewhat higher than the bottom of the blocks 6, respectively. These permanent magnets 8, non-magnetic plates 7 and the blocks 6 are integrated with one after another into an assembly and adapted to be slid laterally together with the inner frame 5 by the handle 12.

The table 13 is composed of a plurality of non-magnetic plates 10, each of which is sandwiched between any two adjoining pieces 9 of a ferro-magnetic substance for composing the table 13, in which the non-magnetic plates 10 are arranged across the table 13 from the front end to the rear end and vertically, just above the intervals 3 between two adjoining grooves 2 of the base plate 1 when the chuck is kept inactive. The piece 9 and the non-magnetic plate 10 are secured firmly one after another so as to form an integrated table 13 which is fixed onto the upper end of the side wall 4. Thus a casing 19 is composed of the table 13, the side wall 4 and the base plate 1.

Now the major part of the magnetic lines of force of the permanent magnet 8 passes through the pieces 9 of the ferromagnetic substance around the non-magnetic plate 7 and the minor part thereof passes through the base plate 1 around the groove 2 when the chuck is kept inactive as shown in FIG. 3. Under these circumstances, it is easy to place, displace and remove a work 11 on and from the upper surface of the table 13. In order to magnetically chuck the work 11 on the surface, the handle 12 is operated to displace the inner frame 5, whereby the permanent magnets 8 are displaced together with the blocks 6 of the ferromagnetic material and the non-magnetic plates 7 into the active position where the permanent magnets 8 and the non-magnetic plates 7 are positioned just under the bottom ends of the non-magnetic plates 10 and just above the intervals 3 of the base plate 1, while the blocks 6 of the ferromagnetic substance are positioned just above the grooves 2, respectively, as shown in FIG. 4. By virtue of this positioning, all magnetic lines of force of the permanent magnet 8 pass through the pieces 9 of the ferromagnetic substance and the work 11 around the non-magnetic plates 10 and 7, so as to magnetically fix the work 11 on the upper surface of the table 13.

FIGS. 5 through 7 show another embodiment of this invention. A rectangular base plate 21 corresponds to the base plate 17 but not provided with the grooves 2 of the preceding example and functions differently. A side wall 24 is in upright position on the base plate 21 and integrated therewith similarly to the preceding example. The base plate 21 and the side wall 24 may be either of a ferromagnetic substance or of non-magnetic material. However, if they are of a ferromagnetic substance, it is necessary to insert a non-magnetic material between the top of the side wall 24 and a table 33 which is composed of non-magnetic plates 30 and ferromagnetic pieces 29 and constructed similarly to that of the preceding example. Thus a casing 39 is composed of the table 33, the side wall 24 and the base plate 21.

Instead of the upper surface of the base plate 1 of the preceding example functioning as a shorting member, there is a movable shorting plate 22. One lateral end 34 of the shorting plate 22 is connected with an eccentric means 35 having a handle 32. Under the other lateral end of the shorting plate 22 is provided a leaf spring 37, on which the shorting plate 22 is adapted to be laterally slidable, so that it is possible to raise and lower the end 34 as well as to let it take the right-hand position and the left-hand position.

On the upper surface of the shorting plate 22, there is a tilting member 40 of an alternate arrangement of permanent magnets 28 and blocks 26 of a ferromagnetic substance secured one after another in an assembly similar to to the preceding example. However, the block 26 is not specifically shaped but shaped in a mere rectangular parallelepiped. It is necessary that the alternation of the magnet 28 and the block 26 corresponds to the effective diameter of the eccentric means 35. There is a shoulder 38 within the lateral end of the casing 39 opposite the leaf spring 37, which is adapted to put a lateral end of the tilting member 40 thereon without forming a substantial clearance between the upper surface of the tilting member 40 and the bottom surface of the table 33.

In operation, when the handle 32 is in the rightmost position as shown in FIG. 5, the tilting member 40 is in contact with the bottom surface of the table 33 by virtue of the shoulder 38 and the permanent magnets 28 are just under the non-magnetic plates 30 while the shorting plate 22 is lowered apart from the bottom surface of the tilting member 40, so that the magnetic lines of force of the permanent magnets 28 extend through the blocks 26 of the ferromagnetic substance to attract a work 31 placed on the upper surface of the table 33 so as to ensure the fixation. When the handle 32 is turned along a half round in the clockwise direction in FIGS. 5 and 6, the shorting plate 22 is lowered and slid leftwards, so that the tilting member 40 is also slid leftwards, brought into disengagement with the shoulder 38, and brought into the lowered position where the upper surface of the tilting member 40 is detached from the bottom surface of the table 33 and the bottom surface thereof is in contact with the shorting plate 22. Under these circumstances, the magnetic lines of force of the permanent magnets 28 are extended through the shorting plate 22 and disappear in the table 33 and above it, so that it is possible to remove and displace the work 31 from and on the table 33. When the handle 32 is turned more along a quarter round as shown in FIG. 7, the tilting member 40 is again raised into the raised position together with the shorting plate 22 and displaced rightwards whereby the magnetic force penetrating the table is half restored and the tilting member 40 is ready to be guided on the shoulder 38 for being in engagement therewith. By virtue of this situation, it is easy to displace the tilting member 40 further rightwards.

When the tilting member 40 is slid and lowered, either the upper surface or the bottom surface thereof is in contact with a part of soft steel without any exceptional instance, so that the tilting member 40 may be moved by a less force, or the handle 32 may be turned lightly.

FIGS. 8 and 9 illustrate further modification of the chuck in accordance with this invention. In this modification, the arrangements of the components of the table 33 and the tilting member 40 cross those in the preceding example. That is, the pieces 28 of a ferromagnetic substance and the non-magnetic plates 30 of the table 33 and the block 28 and permanent magnets 26 of the tilting member 40 are arranged laterally and extended from an end to the other end. Because of the horizontally invariable relationship of the table to the tilting member, the action of this embodiment is not so sufficiently effective as in the preceding example. However, this embodiment is practically enough useful and, in addition, inexpensive.

While particular embodiments of the invention have been illustrated and described, further modifications thereof will readily occur to those skilled in the art. It should be understood therefore that the invention is not limited to the particular arrangements disclosed but that the appended claims are intended to cover all modifications which do not depart from the true spirit and scope of the invention.

What is claimed as new and desired to be secured by Letters Patent of the United States is:

1. A chuck of permanent magnets comprising a table for magnetically chucking work, a plurality of permanent magnets and a shorting member having a plurality of grooves in the surface thereof, said table comprising a plurality of non-magnetic plates interposed between adjacent pieces of a ferromagnetic substance, said permanent magnets being separated by blocks of a ferromagnetic substance, said permanent magnets and said blocks being mounted together as an assembly, said assembly being mounted between said table and said shorting member, said assembly being moveable between a first "on" position and a second "off" position to operate said chuck, said grooves being extended across the direction of movement of said blocks such that each of said blocks of ferromagnetic substance is positioned above said grooves and out of contact with said shorting member in said "on" position and each of said permanent magnets is positioned substantially vertically below a said ferromagnetic piece in said "off" position.

2. A chuck of permanent magnets comprising a table for magnetically chucking work, a plurality of permanent magnets and a moveable shorting member, said table comprising a plurality of non-magnetic plates interposed between adjacent pieces of a ferromagnetic substance, said permanent magnets being separated by blocks of a ferromagnetic substance, said permanent magnets and said blocks being mounted together as an assembly, said assembly being mounted between said table and said shorting means, said assembly being moveable between a first "on" position in which said blocks are brought out of contact with said shorting member by lowering the latter, said blocks when they are out of contact with said shorting member being positioned just under said pieces and in contact therewith by being slid horizontally, and a second "off" position in which each of said permanent magnets is positioned substantially vertically below a said ferromagnetic piece in said "off" position with said blocks in contact with said shorting member.

3. A chuck of permanent magnets, as claimed in claim 2 wherein said assembly is tiltable and is adapted to be brought into a position where said tiltable assembly is carried by a shoulder by raising and sliding said tiltable assembly on and in contact with said shorting member together therewith whereby the magnetic lines of force of said permanent magnets do not penetrate said table upwards until said tiltable assembly has been carried by said shoulder.

4. A chuck of permanent magnets, as claimed in claim 3, in which said shorting member is adapted to be brought out of contact with said tiltable assembly after the latter has been carried by said shoulder, so that the magnetic lines of force of said permanent magnets are made to penetrate said table upwards.

References Cited

UNITED STATES PATENTS

| 3,179,858 | 4/1965 | Binder et al. | 335—295 |
| 2,346,193 | 4/1944 | Simmons | 335—295 |
| 2,533,348 | 12/1950 | Brandenburg | 335—295 |
| 3,010,054 | 11/1961 | Goudsmit | 335—295 |

FOREIGN PATENTS

| 939,584 | 10/1963 | Great Britain. |

G. HARRIS, Primary Examiner

U.S. Cl. X.R.

335—295